US006182572B1

(12) United States Patent
McKillip

(10) Patent No.: US 6,182,572 B1
(45) **Date of Patent: *Feb. 6, 2001**

(54) METHOD AND APPARATUS FOR PRODUCING MULTIPLE CUT BUSINESS FORMS

(75) Inventor: John J. McKillip, Chicago, IL (US)

(73) Assignee: Malessa Partners, L.L.C., Chicago, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/199,512

(22) Filed: Nov. 25, 1998

Related U.S. Application Data

(63) Continuation-in-part of application No. 09/143,927, filed on Aug. 29, 1998, now abandoned.

(51) Int. Cl.[7] .......... B32B 31/00

(52) U.S. Cl. .......... 101/494; 156/64; 156/268; 156/353; 156/356; 156/362; 156/519

(58) Field of Search .......... 101/494, 118, 101/127.1; 428/187, 34, 195; 156/273.1, 268, 257

(56) References Cited

U.S. PATENT DOCUMENTS

| | | | | |
|---|---|---|---|---|
| 3,291,044 | * | 12/1966 | Van Der Winden | 101/118 |
| 3,861,912 | * | 1/1975 | Ibrahim | 428/34 |
| 3,863,567 | * | 2/1975 | Hastings | 101/187 |
| 4,379,573 | | 4/1983 | Lomeli et al. | 428/42 |
| 4,461,661 | * | 7/1984 | Fabel | 156/252 |
| 4,495,582 | * | 1/1985 | Dessert et al. | 101/248 |
| 4,512,256 | | 4/1985 | Schriber et al. | 101/248 |
| 4,664,031 | | 5/1987 | McKillip | 101/127.1 |
| 4,715,530 | * | 12/1987 | Leese et al. | 229/73 |
| 4,824,503 | | 4/1989 | Wilen | 156/204 |

(List continued on next page.)

OTHER PUBLICATIONS

Letter to Mark Hetzler from David Steidinger dated Nov. 23, 1999 (9 pages).
Letter to Jim Schulty from David Steidinger dated May 13, 1999 (2 pages).
Letter to Jim Schulty from David Steidinger dated May 11, 1999 (3 pages).
Letter to Jim Schulty from Gayle Harrop dated May 7, 1999 (1 page).
Drawing No. 920629, entitled "Proposal for UARCO Business Forms" and dated Jun. 29, 1992 (1 sheet).
Drawing No. 921014, entitled "Hamilton Jumbo/Stencil–Label Applicator" and dated Oct. 14, 1992 (1 sheet).
Document entitled "Label/Form Combinations New Ideas for the Growing Market" and dated 1993 (15 pages).
Document entitled "Label/Form Combinations New Ideas for the Growing Market" (no date shown) (8 pages).
Drawing No. 930710, entitled "F300R Top Loading—Turn Pin Band Rotary Collator" and dated Jan. 24, 1992 (1 sheet).
Document entitled "formsmfg" and dated Aug. 1993 (2 pages).

(List continued on next page.)

*Primary Examiner*—Eugene Eickholt
(74) *Attorney, Agent, or Firm*—Fitch, Even, Tabin & Flannery

(57) ABSTRACT

A method and apparatus for manufacturing multiple die cut business forms is disclosed. One embodiment of a printing press according to the present invention includes a number of different stations that are connected together by a continuous web. Multiple die cut business forms are produced by a continuous process from stock paper to an output configuration such as continuous roll, fan fold, or cut sheet. One aspect of the present invention is that a silicone treated glassine stock paper substrate can be utilized to allow business forms to be produced with minimized curling.

5 Claims, 2 Drawing Sheets

U.S. PATENT DOCUMENTS

| | | | | |
|---|---|---|---|---|
| 5,011,559 | | 4/1991 | Felix | 156/257 |
| 5,021,110 | | 6/1991 | Kobayashi | 156/249 |
| 5,078,375 | | 1/1992 | Steidinger | 270/52 |
| 5,086,683 | | 2/1992 | Steidinger | 83/674 |
| 5,098,759 | | 3/1992 | Felix | 428/42 |
| 5,129,682 | | 7/1992 | Ashby | 283/81 |
| 5,211,096 | | 5/1993 | Steidinger | 83/674 |
| 5,224,408 | | 7/1993 | Steidinger | 83/674 |
| 5,238,182 | * | 8/1993 | Loch | 229/304 |
| 5,262,214 | | 11/1993 | Instance | 428/40 |
| 5,337,663 | | 8/1994 | McKillip | 101/127.1 |
| 5,381,947 | | 1/1995 | Steidinger | 229/71 |
| 5,405,076 | | 4/1995 | Steidinger | 229/69 |
| 5,427,832 | | 6/1995 | Longtin | 428/40 |
| 5,441,796 | | 8/1995 | Steidinger et al. | 428/195 |
| 5,462,488 | | 10/1995 | McKillip | 462/26 |
| 5,507,901 | * | 4/1996 | Lima et al. | 156/200 |
| 5,540,148 | | 7/1996 | Oumiya et al. | 101/212 |
| 5,562,789 | * | 10/1996 | Hoffmann | 156/277 |
| 5,580,640 | | 12/1996 | Kraft et al. | 428/195 |
| 5,632,842 | | 5/1997 | Oliver et al. | 156/268 |
| 5,640,831 | | 6/1997 | Harrod et al. | 53/429 |
| 5,640,835 | | 6/1997 | Muscoplat | 53/569 |
| 5,656,369 | * | 8/1997 | Chess et al. | 428/331 |
| 5,700,536 | | 12/1997 | Steidinger | 428/40.1 |
| 5,707,475 | | 1/1998 | Steidinger et al. | 156/257 |
| 5,776,289 | | 7/1998 | Steidinger | 156/273.1 |
| 5,782,691 | | 7/1998 | Stewart | 462/4 |
| 5,807,623 | | 9/1998 | Chess | 428/195 |
| 5,861,457 | * | 1/1999 | Wedner et al. | 524/588 |
| 5,890,743 | * | 4/1999 | Garrison et al. | 283/109 |
| 5,928,748 | * | 7/1999 | Jones et al. | 428/40.2 |
| 6,086,694 | * | 7/2000 | Winter et al. | 156/64 |

OTHER PUBLICATIONS

Document entitled "Form Your Future With Flexible Manufacturing" (no date shown) (2 pages).

Drawing No. 930928, entitled "Tamarack Label Application In–Line Installation with Hamilton 28"D. Roll 20" Web Collator for General Business Forms," and dated Sep. 27, 1993 (1 sheet).

Document entitled "General Business Forms" and dated Oct. 29, 1993 (3 pages).

Document entitled "Tamarack Products Inc. Invoice No. 940921" and dated Sep. 21, 1994 (3 pages).

Drawing No. 931012, entitled "Proposal for Uarco–In Line Installation of Tamarack Window Patch Applicator for Didde Web Press" (no date shown) ( 1 sheet).

Document entitled "Purchase Order No. BA–067631" and dated Dec. 13, 1993 (10 pages).

Document entitled "Tamarack Products Inc. Invoice No. 940817" and dated Aug. 17, 1994 (1 page).

Document entitled "Tamarack Products Inc. Invoice No. 941221" and dated Dec. 21, 1994 (1 page).

Document entitled "A New Day Is Dawning in The Business Forms Industry" (no dated shown) (4 pages).

Document entitled "Digipress 300XE/C" (no date shown) (2 pages).

Document entitled "Tamarack Label Applicator" and dated Dec. 1993 (12 pages).

Document entitled "Showplace Exhibitors Product Index" and dated Apr. 10–13, 1994 (2 pages).

Document entitled "Formations 94 Showplace Exhibition Map" (no dated shown) (4 pages).

Document entitled "Tamarack Affixing Equipment integrated with an Aquaflex press for GenForms" and dated Aug. 1, 1997 and letters dated Jul. 10, 1997, Aug. 1, 1997 and Sep. 3, 1997 (5 pages).

Drawing No. 970709–1, entitled "Proposal for Aquaflex Press"and dated Nov. 22, 1999 (1 sheet).

Document entitled "GenForms Purchase Order" and dated Feb. 4, 1998 (1 page).

Letter on Aquaflex stationary to a Mr. Quinlan and dated Mar. 25, 1998 (2 pages).

Drawing No. DP–1935 entitled "Flexo Press BX 1305" and dated Mar. 24, 1998 (1 sheet).

* cited by examiner

METHOD AND APPARATUS FOR PRODUCING MULTIPLE CUT BUSINESS FORMS

CROSS-REFERENCE TO RELATED APPLICATIONS

This application is a continuation-in-part of U.S. application Ser. No. 09/143,927 which was filed on Aug. 29, 1998 and is now abandoned.

FIELD OF THE INVENTION

The present invention generally relates to a method and apparatus for manufacturing business forms and, more particularly, to a method and apparatus for producing multiple-die cut business forms for a variety of applications.

BACKGROUND OF THE INVENTION

U.S. Pat. No. 4,379,573 to Lomeli et al. discloses a business form with a removable label and a method for producing the same. According to the Lomeli et al. patent, a paper substrate in the form of either individual sheets or a continuous strip is fed into a paper processing apparatus. The paper process apparatus produces the business form having a removable label disposed thereon by a method comprising the steps of imprinting information on the paper substrate, applying transfer tape to the paper substrate, die cutting the substrate to form a label, and subsequently collating, cutting, or storing the resulting product. The disclosure of U.S. Pat. No. 4,379,573 hereby incorporated by reference herein.

There are various devices that are currently available for producing business forms such as integrated labels in accordance with, for example, the method and apparatus disclosed in the Lomeli et al. patent. A number of such devices are commercially available from a company called Tamarack. The Tamarack devices produce a number of different types of business forms including label/form combinations, integrated labels, integral cards, fold and seal mailers, stencil/form combinations, continuous envelopes, affixed windows, promotional forms, and the like. A source of pin-feed paper having pin hole punching disposed at a generally uniform interval along both sides of the paper allow it to be fed through the device. Such Tamarack devices generally include a pin-feed paper infeed unit, a vacuum applicator unit, an unwind unit containing transfer tape, a hot melt applicator head, a feed control unit, and integral die cut unit, a hot melt unit, and a roll/fold/sheet delivery unit. Typically, the pin-feed paper that is fed into the Tamarack device is manufactured on a separate piece of equipment that, most usually, is owned and operated by a separate company from the company that runs the Tamarack device.

What is desired is an improved method and apparatus for manufacturing multiple die cut business forms.

SUMMARY OF THE INVENTION

It is desirable to provide a printing press that produces multiple die cut business forms in a variety of output configurations directly from stock paper via a continuous web, in-line process.

Such a printing press that produces multiple die cut business forms from stock paper via a continuous web, in-line process has a number of advantages. First, the costs of manufacturing business forms are reduced because the forms are produced with one piece of equipment. Second, the costs of manufacturing business forms is reduced because there is no need to perform any secondary operations on the stock paper fed into the printing press such as line hole punching. Third, the labor costs associated with manufacturing business forms are significantly reduced because a lesser number of personnel is needed to run the printing press during operation and there is no need for any separate affixing operations.

It also is desirable to produce a partially processed business form with a printing press such as, for example, the above-referenced printing press by a method including the steps of providing a glassine substrate, silicone treating the glassine substrate, and applying adhesive directly to the silicone treated glassine substrate.

Producing a partially processed business form in this manner has a number of advantages. First, the silicone treated glassine substrate can be utilized in printing presses as, for example, described herein with minimized curling. Second, pressure sensitive labels manufactured in accordance with this process can be utilized more effectively because, for example, the label can be easily removed from the substrate.

Other features and advantages of the invention will become apparent from the description that follows.

DETAILED DESCRIPTION OF THE INVENTION

Figures 1, 2, 3, 4, 5, 6, 7, 8:
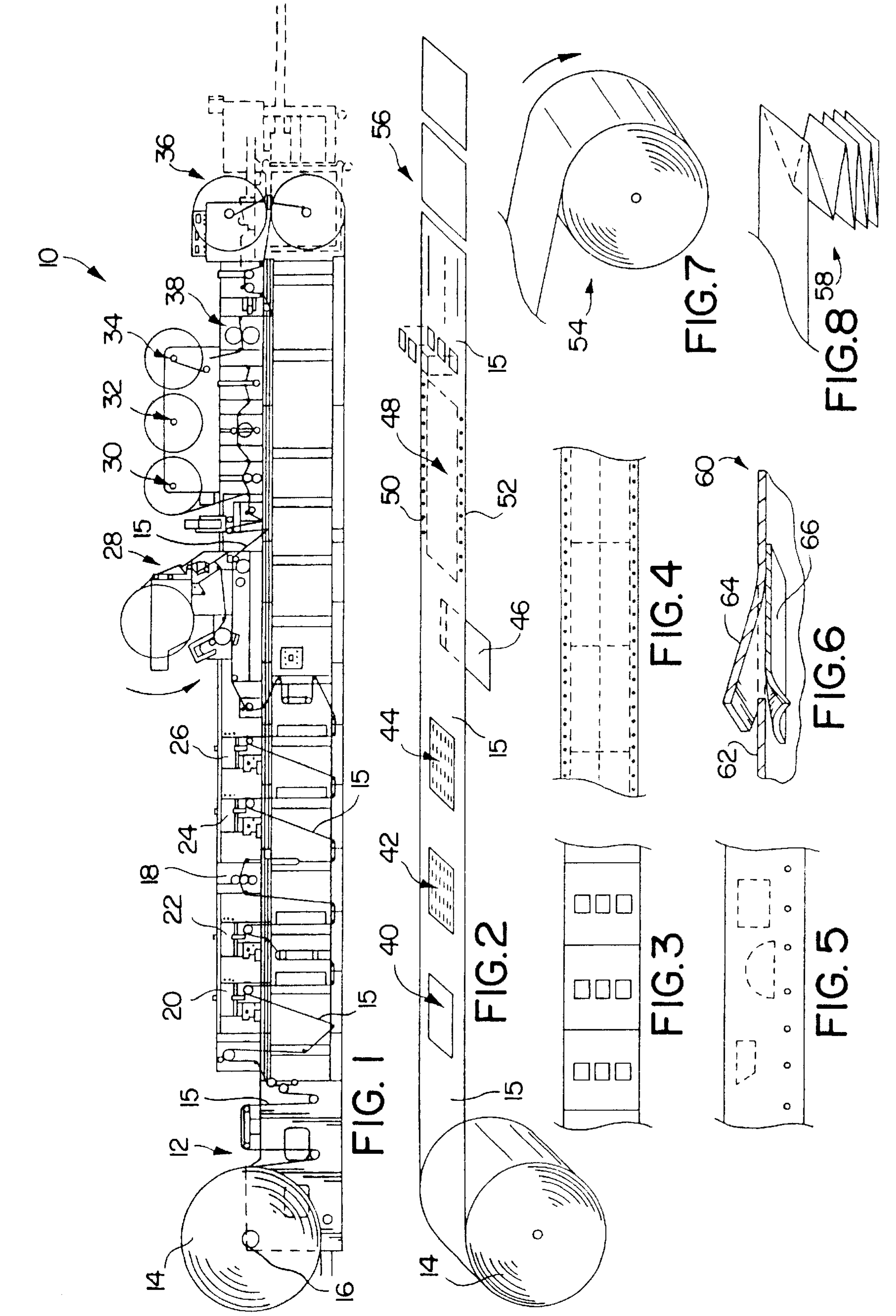
FIG. 1 is a side view of one embodiment of a printing press that is used to manufacture multiple die cut business forms according to the principle of the present invention.
FIG. 2 is a schematic diagram that illustrates various operations that are performed by the printing press shown in FIG. 1.
FIGS. 3–5 illustrate three embodiments of multiple die cut business forms that can be produced by the printing press shown in FIG. 1.
FIG. 6 is a partial sectional view of one embodiment of a multiple die cut business form that is produced by the printing press shown in FIG. 1.
FIGS. 7–8 are perspective, diagrammatic illustrations of manners for collating or storing the multiple die cut business forms produced by the printing press shown in FIG. 1.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

A side view of one embodiment of a printing press 10 that is used to manufacture multiple die cut business forms according to the principle of the invention is shown in FIG. 1. Printing press 10 comprises a number of individual stations that perform specified functions and are connected together by a continuous web so that, for example, multiple die cut business forms may be manufactured in a variety of output configurations directly from a source of stock paper as described in greater detail hereafter.

Printing press 10 includes a receiver station 12 upon which a source of stock paper is mounted. In the embodiment shown in FIG. 1, the stock paper source comprises a roll 14 of stock paper that is rotatably mounted on receiver section 12 by means of axle to supply a continuous web 15 of paper to the printing press 10 16. Printing press 10 is used to manufacture multiple die cut business forms directly from the stock paper roll 14 without the need for any secondary processing such as line-hole punching or separate affixing operations prior to beginning the manufacturing process.

Printing press 10 includes two printing stations 20 and 22 that are connected to the receiver station 12 by means of the continuous web 15. A die cutting station 18 is connected to the printing stations 20 and 22 by the continuous web 15. Two printing stations 24 and 26 are connected in series by the continuous web 15 to die cutting station 18. The continuous web 15 connects an adhesive strip-patch station 28 to printing station 26. Adhesive strip-patch units suitable for use with the present invention are commercially available from a company called Tamarack (Wauconda, Ill.).

Three post adhesive patch die cutting stations 30, 32, and 34 are connected in-line with the adhesive strip-patch station 28 by the continuous web 15 as shown. The continuous web 15 connects a finishing station 36 to the third post adhesive patch die cutting station 34 via punching station 38 as shown in FIG. 1. The various stations 14–34 and 38 perform various operations in a predetermined order so that various types of multiple die cut business forms may be produced in the output configuration specified by finishing station 36 as discussed in greater detail hereafter.

One aspect of the present invention is that a roll of glassine paper may be utilized as the roll of stock paper 14 shown, for example, in FIG. 1. Glassine paper is supercalendered, is manufactured principally from chemical wood pulps which have been beaten to secure a high degree of stock hydration, has a smooth finish, and is transparent. The physical make-up of glassine paper allows it to have a high degree of resistance to the passage of air, to be almost impervious to the passage of water vapor, and to be grease resistant. Glassine paper can be provided in various colors and, if desired, can be made opaque by the addition of various fillers as readily apparent to those of ordinary skill in the art to which this invention pertains. A glassine paper substrate is provided with a silicone treatment which typically may be accomplished at the mill where the substrate is manufactured. This allows, for example, pressure sensitive labels to be manufactured with reduced curling.

FIG. 2 is a schematic diagram that illustrates various operations that are performed by the printing press shown in FIG. 1. Paper from the stock paper roll 14 may be die cut by die cutting station 18 in any desired shape as, for example, shown at location 40. Preferably, the shape of the operation performed by die cutting station 18 is dictated by the type of business form being produced by the printing press 10 in a particular application. Locations 42 and 44 indicate examples of printing operations that can be performed by printing stations 20, 22, 24, and 26. It should be noted that printing stations can perform a variety of printing operations including, for example, multi-color printing as readily apparent to those of ordinary skill in the art to which this invention pertains.

One aspect of the present invention that provides significant cost advantages is that the printing press 10 totally eliminates the use of stand-alone, off-line affixing which typically is accomplished by means of a communicator, a web attacher, or other off-line affixing equipment that is totally separate from a prior art printing press. Utilization of the printing press 10 to manufacture multiple die cut business forms allows affixing to occur either on the front of a form to produce a reverse-frame stencil or on the back of the form to produce an integrated stencil via a totally in-line process.

Referring back to FIG. 2, the adhesive strip/patch unit 28 allows an adhesive patch 46 to be removably affixed to the paper backing from the stock paper roll 14. Unit 28 may be programmed to allow patch 46 to have any desired length and shape. Die cutting units 30, 32, and 34 perform post-adhesive patch/strip operations as needed in accordance with the type of multiple die cut business form being prepared in a particular application as desired and as shown at location 48. Punching station 38 is provided in the continuous web from receiver station 12 to finishing station 36 to allow the multiple die cut business forms to be produced by printing press 10 in a given application to have line-hole punching as shown at 50 and 52 or perforations. FIGS. 3–5 show additional examples of the die cutting and punching operations that can be performed by die cutting stations 30, 32, and 34 as well as punching station 38. One aspect of finishing unit 36 is to process the multiple die cut business forms produced by printing press 10 in one of three output configurations: output roll form as shown at 54 in FIG. 7, cut sheet form as shown at 56 in FIG. 2, and fan-fold form as shown at 58 in FIG. 8.

FIG. 6 is a partial sectional view of one embodiment of a multiple die cut business form 60 that is produced by the printing press shown in FIG. 1. Business form 60 includes a substrate portion 62 that is die cut by the die cutting station 18 to form a die cut portion 64. An adhesive patch 66 is secured to a desired portion of the business form 60 as shown.

The functions provided by the various stations of printing press 10 can be applied in any desired way to allow a variety of different types of business forms to be produced as discussed in greater detail hereafter. For example, one unique aspect of the present invention is that an adhesive patch can be applied to an integrated stencil, label, or pocket as well as delivering a finished product at the end of the printing press in cut sheet, continuous, or roll form which obviates the need for line-hole punching or any other secondary operations to be performed on the stock paper that is mounted on receiver station 12.

Another aspect of the present invention is to allow multiple die cutting operations to be performed on a cut-sheet integrated label, stencil, pocket or the like while simultaneously printing graphics on the form, both prior to and after the application of an adhesive patch as well as post-operation die cutting and perforating. Materials suitable for use in the printing press 10 in this case include, for example, plastic, films, tough papers, tags, card stocks, vinyl, stencil material and the like. Additionally, an easy-removal thumb notch can be provided in a business form while it is being manufactured in-line in the printing press 10 by means of the die cutting stations 18 and 30, 32, and 34 both prior to and after the application of the adhesive patch by station 28.

Integrated stencils can be manufactured by printing press 10 in continuous, cut sheet, or roll form by affixing stencil material in-line while simultaneously printing the form graphics, then die-cutting the back of the stock and removing the die cut material. This also provides the option of forming a label for address identification by die cutting the stencil material and leaving ties so that, for example, a die cut round cornered rectangle remains in the form after direct contact, non-contact, or thermal imaging processing.

Another aspect of the present invention is that the printing press 10 can be utilized to provide horizontal perforations at predetermined intervals on multiple die cut business forms that are processed by finishing station 36 either in cut sheet, continuous fan-folded, or roll form. Applications of the present invention in this context includes invoices, packing lists, bills of lading, letterhead and the like. In this case, the business form is provided with two labels, one of which would be formed so that it could be immediately removed during use and placed on an envelope on which will be printed the name and the address of the recipient and the sender. The other label would be formed by a die cut with a perforation around its perimeter, with or without a thumb notch. The second label has the sender and recipient information reversed. Such business forms are particularly useful for any formal document that would have to be executed and returned to the sender such as, for example, legal papers or mortgage documents.

Figure 9:
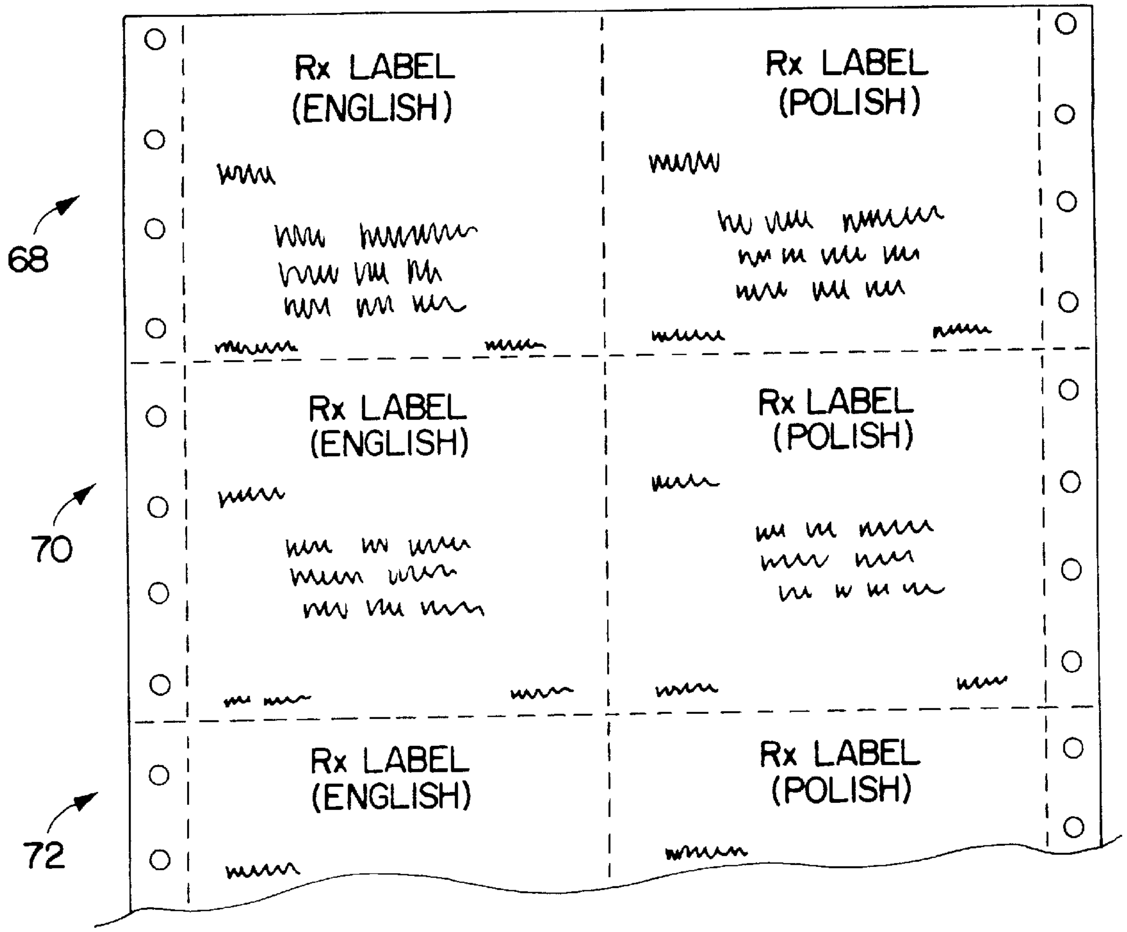
FIGS. 9–10 illustrate exemplary multiple die cut business forms comprising a dual-language pharmacy label according to one aspect of the present invention.
Figure 10:
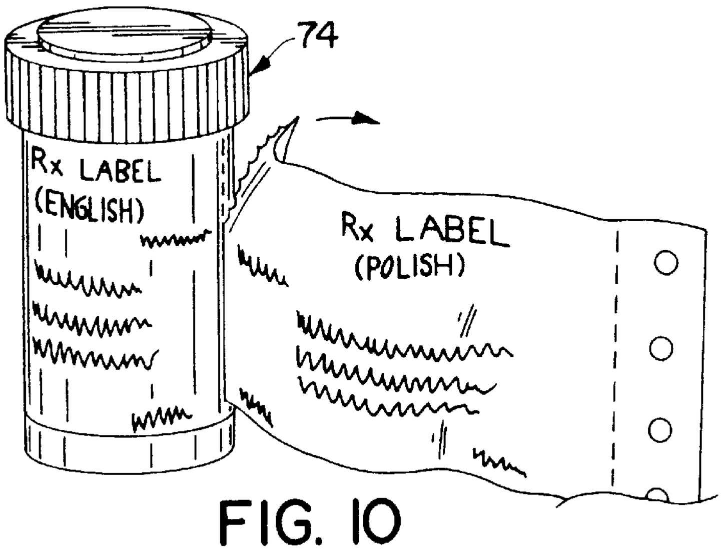

Referring to FIGS. 9–10, exemplary multiple die cut business forms comprising a dual-language pharmacy label according to one aspect of the present invention are illustrated. FIG. 9 shows three pharmacy labels 68, 70, and 72 all of which include two sections having the same information printed in different languages. FIGS. 9 and 10 show the English and Polish languages. The line-hole punching provided on both sides of the pharmacy labels is useful for dot-matrix printing or other line-hole type printing applications. However, it should be appreciated that this feature is optional because, for example, of the widespread use of laser printers. In any case, one side of the pharmacy label includes adhesive so that it may be bonded to a pill bottle 74 as shown in FIG. 10.

During use, the pharmacist prints the relevant pharmaceutical information in different languages on both sides of each one of the pharmacy labels 68, 70, and 72 and affixes the label to the bottle as shown in FIG. 10. This embodiment of a multiple die cut business form has a number of unique advantages that generally prevent communication difficulties. For example, this embodiment is particularly advantageous in the home health care environment where the patient or domestic workers in the home do not speak the same language or speak different languages than emergency service personnel such as paramedics who service the area in question. For example, in a situation where a Polish speaking person was accidentally overmedicated and an English speaking paramedic arrived to render assistance, the use of the dual pharmacy labels shown in FIGS. 9–10 allow the paramedic to immediately understand what type of medication was taken. This feature of the present invention allows patients to more precisely follow a prescribed prescription regimen and minimizes the potential danger for accidental overmedication or poisoning.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A printing press for producing multiple die cut business forms comprising, in combination:

means for receiving a roll of stock paper, said roil being mounted for rotation about an axis;

at least two means for printing on selected areas of said stock paper from said roll;

means for applying an adhesive patch to selected areas of said stock paper from said roll;

a first means located prior to the means for applying an adhesive patch and in between at least two of the at least two means for printing for die cutting selected areas of the stock paper to provide forms with a predetermined shape;

a second means located after the means for applying an adhesive patch for die cutting selected areas of the stock paper at the adhesive patch contiguous therewith so as to provide each form with multiple die cuts to create at least one label or card integral therewith; and means for interconnecting said receiving means, said printing means, said applying means, and said first and second die cutting means together so that multiple die cut business forms are produced from and transported through the printing press by means of a continuous web of paper being supplied by the role of stock paper and being converted into the forms.

2. The printing press of claim 1 wherein said roll of stock paper comprises glassine paper.

3. An apparatus for making printed forms with multiple cuts and at least one label or card integral with each of the forms comprising:

a receiver station in which a roll of stock paper is mounted for rotation about an axis to supply a continuous paper web that is capable of being moved through the apparatus and converted to forms;

at least two printing stations positioned after the receiver station to print on the paper web extending therethrough;

an adhesive patch station positioned after the at least two printing stations to affix a patch to at least a predetermined portion of the paper web extending therethrough with pressure sensitive adhesive;

at least a first cutting station positioned prior to the adhesive patch station and in between at least two of the at least two printing stations to cut the paper web extending therethrough to provide forms depending on a predetermined shape; and at least a second cutting station positioned after the adhesive patch station to cut the paper web extending therethrough at the patch to provide multiple cuts so as to produce forms with at least one integrated label or card.

4. The apparatus of claim 3 wherein said roll of stock paper comprises glassine paper.

5. A printing press for producing multiple die cut business forms comprising, in combination:

means for receiving a continuous roll of paper without line-hole punching, the continuous roll of paper supplying a continuous web of paper that is converted to forms;

at least two means for printing images on selected areas of the continuous web of paper;

means for applying an adhesive patch to a predetermined area of the continuous web;

a first means for die cutting positioned before the means for applying an adhesive patch and in between the at least two means for printing and capable of providing at least one cut to the paper web extending therethrough; and a second means for die cutting after application of the adhesive patch to cut selected areas of the continuous web at the adhesive patch contiguous therewith to provide multiple cuts at the patch to provide at least one integrated label or card.

* * * * *